(12) United States Patent
Hanby et al.

(10) Patent No.: US 10,259,313 B2
(45) Date of Patent: Apr. 16, 2019

(54) FUEL PUMP ASSEMBLY WITH REMOVABLE SUPPORTS

(71) Applicant: Walbro LLC, Tucson, AZ (US)

(72) Inventors: Jeffrey D. Hanby, Cass City, MI (US); Kevin L. Israelson, Cass City, MI (US); Douglas W. Salowitz, Jr., Palms, MI (US); Roger N. Smith, Lapeer, MI (US); David L. Speirs, Cass City, MI (US)

(73) Assignee: Walbro LLC, Tucson, AZ (US)

( * ) Notice: Subject to any disclaimer, the term of this patent is extended or adjusted under 35 U.S.C. 154(b) by 15 days.

(21) Appl. No.: 15/474,182

(22) Filed: Mar. 30, 2017

(65) Prior Publication Data

US 2017/0284418 A1    Oct. 5, 2017

Related U.S. Application Data

(60) Provisional application No. 62/315,360, filed on Mar. 30, 2016.

(51) Int. Cl.
| | |
|---|---|
| *B60K 15/03* | (2006.01) |
| *F02M 37/00* | (2006.01) |
| *F04D 29/60* | (2006.01) |
| *F02M 37/10* | (2006.01) |

(52) U.S. Cl.
CPC ......... *B60K 15/03* (2013.01); *F02M 37/0017* (2013.01); *F02M 37/0076* (2013.01); *F02M 37/103* (2013.01); *F04D 29/605* (2013.01); *B60K 2015/03243* (2013.01)

(58) Field of Classification Search
CPC ...... F02M 37/103; F02M 37/106; F04B 17/03
See application file for complete search history.

(56) References Cited

U.S. PATENT DOCUMENTS

| | | | |
|---|---|---|---|
| 5,427,074 A | 6/1995 | Tuckey | |
| 6,155,793 A | 12/2000 | Tuckey et al. | |
| 6,213,100 B1 | 4/2001 | Johansen | |
| 6,761,193 B1 | 7/2004 | Cotton et al. | |
| 6,907,865 B1 * | 6/2005 | Hanby .................. | F02M 37/103 123/509 |
| 7,074,058 B2 * | 7/2006 | Jurcak ...................... | B23P 19/04 439/92 |
| 7,159,575 B2 * | 1/2007 | Inoue ................... | F02M 37/103 123/509 |
| 7,219,658 B2 * | 5/2007 | Torii .................... | F02M 37/025 123/509 |
| 7,222,610 B2 * | 5/2007 | Okazono .............. | F02M 37/103 123/509 |
| 7,249,594 B2 * | 7/2007 | Hashiguchi .......... | F02M 37/025 123/509 |
| 7,318,422 B2 | 1/2008 | Douyama et al. | |
| 7,387,112 B2 * | 6/2008 | Oohashi ............... | F02M 37/025 123/509 |
| 7,389,768 B2 * | 6/2008 | Hayakawa ........... | F02M 37/106 123/509 |

(Continued)

*Primary Examiner* — Bradley Duckworth
(74) *Attorney, Agent, or Firm* — Reising Ethington P.C.

(57) ABSTRACT

An in-tank fuel pump assembly may have a mounting flange with a plurality of first couplings, a fuel pump, a carrier connected to the fuel pump, a plurality of second couplings on at least one of the carrier and the fuel pump, and a plurality of supports each connected to one of the first and second couplings to locate the pump relative to the mounting flange.

13 Claims, 3 Drawing Sheets

(56) References Cited

U.S. PATENT DOCUMENTS

| | | | | |
|---|---|---|---|---|
| 7,690,359 B2* | 4/2010 | Price | F02M 37/106 | |
| | | | 123/509 | |
| 8,297,260 B2* | 10/2012 | Masuda | F02M 37/106 | |
| | | | 123/509 | |
| 8,689,827 B2* | 4/2014 | Okazono | F02M 37/0017 | |
| | | | 123/509 | |
| 8,919,326 B2* | 12/2014 | Lim | F02M 37/103 | |
| | | | 123/509 | |
| 8,939,736 B2* | 1/2015 | Israelson | F04D 5/002 | |
| | | | 417/310 | |
| 9,169,833 B2* | 10/2015 | McCormick | F04D 5/002 | |
| 9,181,902 B2* | 11/2015 | Kimoto | F02M 25/089 | |
| 9,267,473 B2* | 2/2016 | Troxler | F02M 37/106 | |
| 9,429,118 B2* | 8/2016 | Oohashi | F02M 37/04 | |
| 2003/0084884 A1* | 5/2003 | Sawert | F02M 37/106 | |
| | | | 123/509 | |
| 2009/0028690 A1* | 1/2009 | Kawajiri | F02M 37/048 | |
| | | | 415/55.1 | |
| 2010/0096533 A1* | 4/2010 | Powell | F02M 37/103 | |
| | | | 248/672 | |
| 2014/0116398 A1* | 5/2014 | Jeon | F02M 37/0017 | |
| | | | 123/509 | |
| 2016/0252059 A1* | 9/2016 | Niwa | F02M 37/22 | |
| | | | 137/544 | |
| 2016/0265494 A1* | 9/2016 | Niwa | F02M 37/22 | |
| 2016/0305381 A1* | 10/2016 | Byrski | F04F 5/10 | |
| 2017/0211530 A1* | 7/2017 | Fukuoka | F02M 37/103 | |
| 2017/0260943 A1* | 9/2017 | Hayashi | F02M 37/025 | |
| 2017/0268470 A1* | 9/2017 | Murakoshi | F02M 37/103 | |
| 2017/0268471 A1* | 9/2017 | Fukui | F02M 37/103 | |
| 2017/0276105 A1* | 9/2017 | Kondo | F02M 37/103 | |
| 2017/0314522 A1* | 11/2017 | Takahashi | F02M 37/106 | |

* cited by examiner

FUEL PUMP ASSEMBLY WITH REMOVABLE SUPPORTS

REFERENCE TO CO-PENDING APPLICATION

This application claims the benefit of U.S. Provisional Application Ser. No. 62/315,360, filed Mar. 30, 2016, which is incorporated herein by reference in its entirety.

TECHNICAL FIELD

The present disclosure relates generally to a fuel pump assembly for a vehicle fuel supply system

BACKGROUND

Vehicles typically include a fuel system with a fuel tank, a fuel pump that pumps fuel from the tank to a vehicle engine to support operation of the engine, and sometimes other components, such as a fuel level sensor, fuel pressure regulator, fuel injectors, fuel filter and the like. In some vehicles, the fuel pump is mounted within the vehicle fuel tank as part of a module or assembly that may include other components of the fuel system, such as the fuel level sensor and one or more fuel filters all carried on a common support structure. Some modules have been mounted in the fuel tank by a mounting flange received in an opening of a fuel tank and secured to a wall of the fuel tank. Often, the fuel tanks are disposed in relatively small and oddly shaped areas which can lead to a wide range of shapes and sizes of fuel tanks. Some fuel tanks may have a limited depth or other constructions that make it difficult to insert a module that includes full size accessories or components into the fuel tank.

SUMMARY

A fuel pump assembly for a fuel tank may include a mounting flange with couplings, a fuel pump, a carrier connected to the fuel pump, couplings on the carrier and/or the fuel pump, and a plurality of spaced-apart supports extending between and connected to the couplings to attach the fuel pump to the mounting flange. The couplings may be configured so that supports of different lengths may be used to permit the same mounting flange, carrier and/or fuel pump to be used in fuel pump assemblies for fuel tanks having a wide range of different shapes and sizes and particularly fuel tanks having different depths between portions of their top and bottom walls in the area in which the fuel pump assembly is mounted in the fuel tank. The couplings may permit either permanent attachment or removable attachment to the supports.

BRIEF DESCRIPTION OF THE DRAWINGS

The following detailed description of certain embodiments and best mode will be set forth with reference to the accompanying drawings, in which.

DETAILED DESCRIPTION

Figure 1:
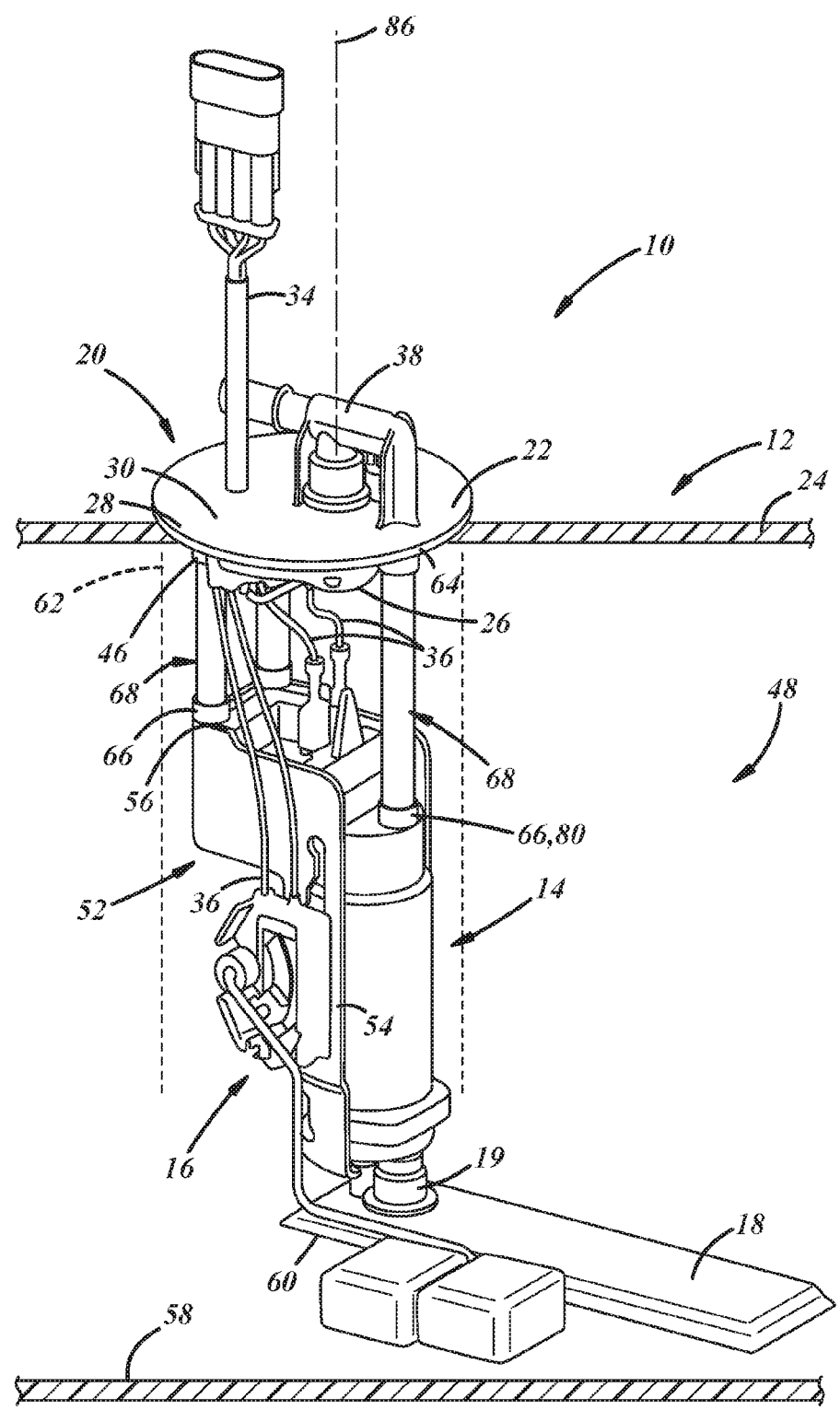
FIG. 1 is a perspective view of a fuel pump assembly.
Figure 2:
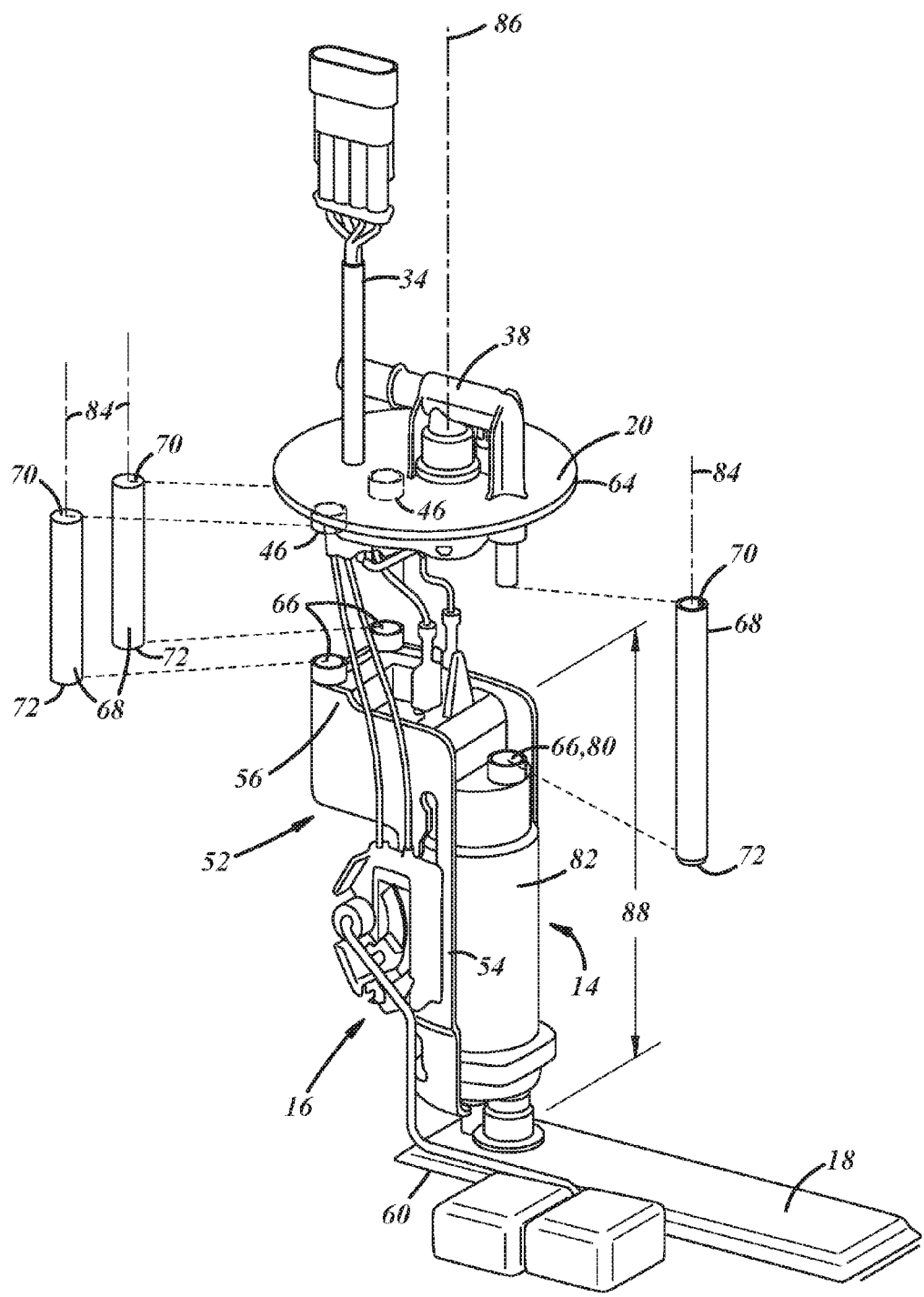
FIG. 2 is an exploded view of the fuel pump assembly.

Referring in more detail to the drawings, FIGS. 1 and 2 illustrate a fuel pump assembly 10 that is constructed and arranged to be disposed within a vehicle fuel tank 12 (only part of which is shown), such as in a marine vehicle, snowmobile, ATV, motorcycle or automobile, which are non-limiting examples. The assembly 10 includes an electric motor driven fuel pump 14 that delivers fuel under pressure from the fuel tank 12 to an engine to support operation of the engine. The fuel pump 14 may include a turbine type pumping element (e.g. a rotary impeller) used to pressurize the fuel, or any other suitable type, including but not limited to a positive displacement pump with gerotor or other pumping elements. The assembly 10 may also include a fuel level sender 16 that provides an indication of the amount of fuel within the fuel tank 12, and a fuel filter 18 that may filter fuel before that fuel is drawn into the inlet 19 of the fuel pump 14.

Figure 3:
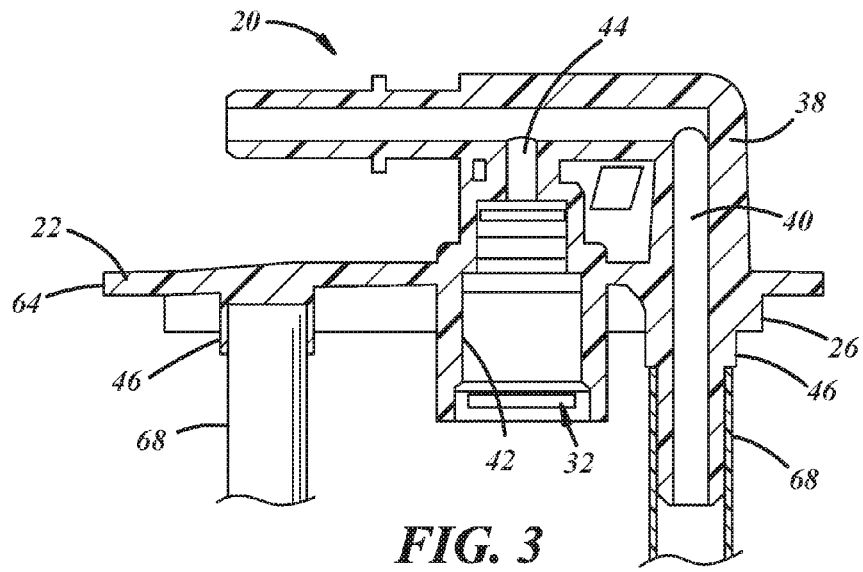
FIG. 3 is a sectional view of a mounting flange of the fuel pump assembly.

The fuel pump assembly 10 includes a mounting flange 20 having a radially outwardly extending lip 22 adapted to overlie and be sealed to a fuel tank wall 24, and may have a depending cylindrical skirt 26 adapted to be received within an opening 28 of the fuel tank. The mounting flange 20 may carry one or more components or accessories of the fuel pump module 10, such as an electrical connector or electrical pass through region 30 (e.g. an area through which wires may pass through the flange, preferably with a seal between the wires and flange) and a fuel pressure regulator 32. The electrical connector or pass through region 30 may couple together wires 34 external to the fuel tank 12 with wires 36 within the fuel tank and connected to, for example, the fuel level sender 16 and the fuel pump 14. In this way, power may be provided to the components 14, 16 within the tank 12, and signals (e.g. indicative of fuel level) from the components may be provided to a location outside of the tank. The fuel level sender 16, pressure regulator 32 and electrical connector or pass through region 30 may be of generally standard construction and will not be described further herein. A fluid fitting 38 with an internal passage 40 (FIG. 3) may be provided on or molded with the mounting flange 20 and may communicate the outlet of the fuel pump 14 with a fuel line through which fuel is delivered to the engine. To retain the pressure regulator 32 on the flange 20, the flange 20 may include a pocket or cavity 42 that receives part of the pressure regulator. The cavity 42 may be communicated with the fluid fitting passage 40 via a connecting passage 44 so that outlet fuel from the fuel pump 14 is communicated with the pressure regulator 32.

The mounting flange 20 may be molded of a polymeric material suitable for use with a polymeric fuel tank 12, and to be sealed to a fuel tank wall 24, or the flange may be formed from metal or any other suitable material. The mounting flange 20 may include one or more first coupling features 46 that may extend into or are otherwise open to an interior 48 of the fuel tank 12 (in which the fuel pump is received) and are constructed and arranged to facilitate coupling the fuel pump 14 to the flange. The first coupling features 46 may include one or more blind bores in cylindrical projections extending from the flange 20, or one or more projections extending from the flange into the fuel tank 12 (e.g. toward the fuel tank interior 48), or both.

The fuel pump 14 may be supported by a carrier 52. The carrier 52 may have any desired shape and size. In the implementation shown, the carrier 52 includes a sidewall 54 that surrounds at least part of the fuel pump 14. The fuel pump 14 could be connected to the carrier sidewall 54 in any suitable way, including by a bracket, clip, band, fasteners or the like, so that the fuel pump is carried by and or retained in place relative to the carrier 52. The carrier 52 may include an upper surface 56 spaced between the flange 20 and a bottom 58 of the fuel tank 12, or a bottom 60 of the fuel pump 14. The upper surface 56 and the fuel pump 14 may be contained within an imaginary cylinder 62 (diagrammatically shown in broken lines in FIG. 1) extending from a periphery 64 of the mounting flange 20, so that the assembly 10 can be received within a fuel tank opening 28 that is covered by the flange 20 when the assembly 10 is mounted to the fuel tank 12. In this way, the flange 20 overlies the fuel pump 14 and carrier 52. Other components like the fuel level sender 16 and the fuel filter 18 may be flexible or movable so that they can also fit through the same fuel tank opening 28 in which the fuel pump 14 and carrier 52 are received, but may have positions wherein they extend outside of the imaginary cylinder 62, as shown in FIGS. 1 and 2.

To retain the position within the fuel tank 12 of the carrier 52 and fuel pump 14, the carrier and/or the fuel pump may be coupled to the mounting flange 20. In the example shown, the carrier 52, fuel pump 14 or both, include one or more second coupling features 66. To connect the carrier 52 and fuel pump 14 to the flange 20, supports 68 extend between the first coupling features 46 on the flange and the second coupling features 66 on one or both of the carrier 52 and fuel pump 14. Each support 68 may be mated to a first coupling feature 46 at one end 70 and to a second coupling feature 66 at a second end 72, and in some implementations this may be accomplished without any additional fasteners, to facilitate assembly and reduce complexity and cost of the fuel pump assembly 10.

For example, where the coupling features 46, 66 include protrusions, the supports 68 may include cavities or passages sized to be press-fit over or onto the protrusions. And where the coupling features 46, 66 includes a cavity (e.g. a blind bore), the supports 68 may be pressed or otherwise received in the cavity. In some implementations, the first or second coupling features 46, 66 may be defined by a cylindrical and tubular wall having an axis, and the associated support 68 may be pressed into the cavity defined within the wall, or over the exterior surface of the wall, such that the wall is received within the support. The connection between the mated components 46, 66, 68 may be maintained with an interference or friction fit to inhibit unintended separation of the components, if desired. Adhesives, threads, welds, clamps, snap/locking features or other modes of connection may be used to maintain the connection between the components, but are not needed in all implementations.

Figure 4:
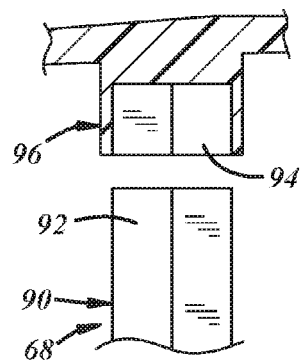
FIG. 4 is a fragmentary sectional view of a coupling and a support.
Figure 5:
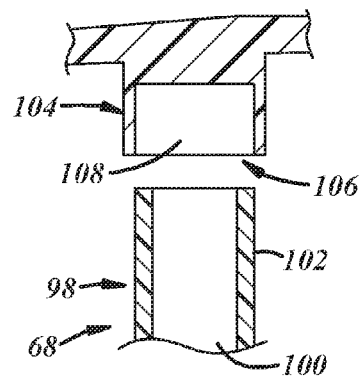
FIG. 5 is a fragmentary sectional view of another coupling and support tube.

As shown in FIG. 2, the supports 68 may be rods with at least cylindrical end portions received in complimentary substantially circular or annular cavities or pockets of couplings 46, 66 and retained therein such as by an interference fit or by an adhesive. As shown in FIG. 4, a support 68 may be a rod or tube 90 with one or both ends 92 in cross-section with a non-circular configuration such as a rectangular configuration 92 which may be received in a complimentary non-circular pocket or recess 94 of a coupling 96. As shown in FIG. 5, a support may be a tube 98 with an interior passage 100 and at one or both of its ends an exterior surface 102 which may be circular or non-circular in cross-section and receivable in a coupling 104 with a recess or pocket 106 with an interior side wall 108 having a complimentary circular or non-circular configuration 108.

Figure 6:
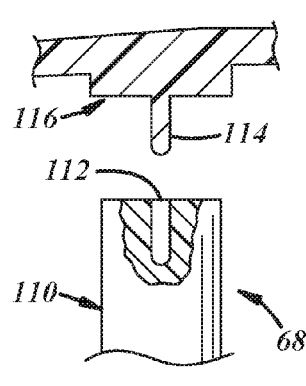
FIG. 6 is a fragmentary sectional view of another coupling and support.
Figure 7:
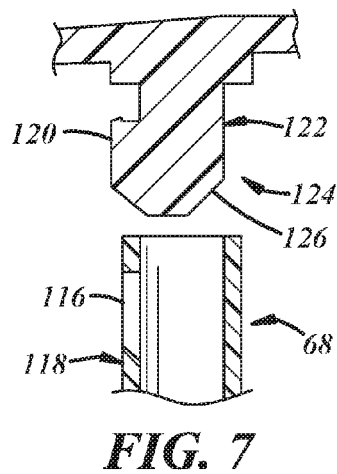
FIG. 7 is a fragmentary sectional view of another coupling and support.

As shown in FIG. 6, a support 110 may have a bore or pocket 112 in one or both ends thereof which may receive a complimentary pin 114 of a coupling 116. As shown in FIG. 7, a tubular support 118 may have a slot or recess 116 adjacent one or both ends which in assembly snaps over and receives therein a complimentary shaped dog or tab 120 extending generally radially from a complimentary cylindrical pin 122 of a coupling 124 to thereby attach an end of the support to the coupling. The pin 122 may have a tapered end portion 126 to facilitate inserting the end of the support 118 over the pin and the dog 120 into the slot 116 of the tube 118. A person of ordinary skill will recognize that many other forms of couplings with complimentary end portions of supports 68 may be utilized to connect the supports to the flange and the carrier 56 and/or fuel pump 14.

In at least some implementations, the supports 68 may be rigid bodies adapted to hold the carrier 52 and fuel pump 14 a set distance from the flange 20. This distance may vary according to the fuel tank 12 in which a fuel pump assembly 10 is used, to, for example, permit the fuel filter and/or fuel pump inlet to be located adjacent to a bottom 58 of the fuel tank 12. Accordingly, supports 68 of different length may be used with the fuel pump assembly 10 to permit the fuel pump assembly to be used in fuel tanks 12 having different dimensions in the area of the fuel pump assembly. In many fuel tanks 12, the fuel pump assembly 10 will be mounted to a top or upper wall 24 and the fuel pump inlet 19 will be adjacent to the bottom 58 or lower wall of the fuel tank. The distance between the upper and lower walls of various fuel tanks may be different. To accommodate such differences, supports 68 of different length may be used with the same mounting flange 20, carrier 52 and fuel pump 14 so that these components may be commonly used in fuel tanks of different sizes and dimensions.

In at least some implementations, the supports 68 are tubular bodies and may be generally cylindrical, if desired. As shown, the carrier 52 includes two coupling features 66, spaced apart about the upper surface 56, and the fuel pump 14 includes one coupling feature 66. Also as shown, the fuel pump coupling feature 66 defines or is communicated with an outlet of the fuel pump 14. That is, the coupling feature 66 may be an outlet fitting 80 of a fuel pump housing 82, through which pressurized fuel is discharged from the fuel pump 14 for delivery to an engine. In such an arrangement, the support 68 connected to the fuel pump 14 constitutes a fuel supply tube and is coupled at one end to the fuel pump 14 and at its other end to the fluid fitting 38 of the mounting flange 20. The support 68 defines an internal passage through which fuel flows from the fuel pump 14 to the fluid fitting 38. The length of this support 68 may vary according to the fuel tank dimensions, as noted above, and the length, diameter or other characteristics may vary according to the fuel pump 14 used. That is, different fuel pumps 14 may be mounted to the carrier 52, and the carrier 52 may be a common component in a range of fuel pump assemblies 10 used in different tanks 12, with different fuel pumps and with different mounting flanges 20.

The other supports 68 (e.g. coupled to the carrier 52) need not include internal passages. Nevertheless, to reduce the number of different components that are needed in the assembly, the supports 68 may all be the same size and formed from the same material, if desired. Accordingly, the supports 68 not connected to the fuel pump 14 may be constructed the same as or similarly to the support 68 that is coupled to the fuel pump 14. Each support 68 may have a different length, the supports may all have the same length, or as shown in FIG. 1, the supports coupled to the carrier 52 may have a first length and the support connected to the fuel pump 14 may be a different length. The supports 68 can be rigid or flexible as desired and may be formed from any desired material including metal, plastic (e.g. nylon), composites and the like, suitable for use with the fuel used in the fuel system. The supports 68 can be formed of one or multiple materials. Further, while shown as being one piece, each or any of the supports 68 may be defined by more than one piece, such as two or more tubes mated together to provide a desired overall length for the support.

In at least some implementations, more than two supports 68 are provided, and the supports are not all aligned with each other (e.g. they are not arranged in a line). In the example shown, there are three supports 68 arranged in a triangular formation so that the forces of the fuel pump 14 and carrier 52 on the flange 20 are balanced to prevent or substantially inhibit swaying or twisting of the pump 14 relative to the flange 20, and to more securely retain the position of the fuel pump 14 relative to the flange 20. While in the illustrated implementation the supports 68 are shown as being parallel, with their longitudinal axes 84 (FIG. 2) parallel to each other and a center axis 86 of the flange 20, the supports 68 may be oriented at angles to each other or to the flange axis 86, as desired.

Further, while the fuel pump 14 and carrier 52 are shown as extending generally vertically toward the flange 20 (e.g. a major dimension 88 of these components is aligned with and extends between the flange 20 and tank bottom 58), the fuel pump 14 and carrier 52 could be at a different angle. For example, for a shallow fuel tank where the top and bottom walls are relatively close together, the fuel pump 14 could be oriented horizontally, where the major dimension of the fuel pump 14 is generally perpendicular to the flange 20. Here, the support 68 coupled to the fuel pump 14 may include a right angle or other bend to accommodate a horizontal fuel pump outlet fitting and also couple with a downwardly facing flange fitting 38. The other supports may likewise include bends or be straight, as desired. And other orientations, shapes and sizes may be used, as desired.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A fuel pump assembly, comprising:
a mounting flange including multiple first coupling features;
a fuel pump supported by the mounting flange;
a carrier coupled to the fuel pump and to the mounting flange; and
supports coupled between the mounting flange and at least one of the carrier and the fuel pump, wherein at least one of the carrier and fuel pump includes second coupling features and the supports are coupled to both the first coupling features and the second coupling features to locate the fuel pump relative to the mounting flange, and wherein each support is rigid and fixed to both the mounting flange and at least one of the carrier and fuel pump to maintain the carrier and fuel pump a set distance from the mounting flange, wherein the fuel pump includes a coupling feature and a support is coupled to the fuel pump at one end and to the mounting flange at the other end.

2. The assembly of claim 1 wherein the supports are connected to the coupling features without any fasteners.

3. The assembly of claim 2 wherein the supports are pressed onto the coupling features with an interference fit or a friction fit provided between them.

4. The assembly of claim 1 wherein fuel flows through the fuel pump coupling feature and the support, and wherein the flange includes a passage communicated with the fuel pump coupling feature via the support.

5. The assembly of claim 1 wherein the supports are tubular bodies and the coupling features includes one or both of protrusions over which the supports are fitted, and cavities into which the supports are fitted.

6. The assembly of claim 1 wherein three or more supports are provided, each support being coupled to the mounting flange at one end and to the fuel pump or the carrier at the other end.

7. The assembly of claim 6 wherein the three supports are not aligned with each other.

8. The assembly of claim 1 wherein at least one support and one of the coupling features coupled to said at least one support comprises a tube with a sidewall with a recess therein and a pin received in the tube and with a dog extending into the recess.

9. The assembly of claim 1 wherein the supports are connected to the coupling features with at least one of adhesives, threads, welds, clamps, molded snaps or molded locking elements.

10. The assembly of claim 1 wherein said supports include at least one support that is not circular in cross-section.

11. The assembly of claim 1 wherein said supports include at least two supports that have two ends and are fixed at one end to the mounting flange and at the other end to the carrier, and wherein each support has the same length.

12. The assembly of claim 11 wherein said supports include another support that is coupled to the fuel pump and has a length different than the length of said at least two supports.

13. The assembly of claim 1 wherein said supports include at least two supports that each have two ends and are fixed at one end to the mounting flange and at the other end to the carrier, and said supports include another support that is coupled to the fuel pump, and wherein said at least two supports and said another support are tubular and have the same outer diameter and the same inner diameter.

* * * * *